(12) United States Patent
Takahashi et al.

(10) Patent No.: US 6,220,020 B1
(45) Date of Patent: Apr. 24, 2001

(54) SECONDARY AIR SUPPLY PASSAGE FOR AN ENGINE

(75) Inventors: Katsunori Takahashi; Sakae Mizumura, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/395,372

(22) Filed: Sep. 14, 1999

(30) Foreign Application Priority Data

Sep. 14, 1998 (JP) ................................................ 10-279427

(51) Int. Cl.[7] ........................................................ F01N 3/00
(52) U.S. Cl. ................................................ 60/293; 60/304
(58) Field of Search ............................. 60/274, 293, 304, 60/305, 306

(56) References Cited

U.S. PATENT DOCUMENTS 4,417,442 * 11/1983 Ikenoya et al. ........................ 60/305
4,450,684 * 5/1984 Otani et al. ............................ 60/293
4,476,676 * 10/1984 Ikenoya et al. ....................... 60/293
4,499,724 * 2/1985 Ikenoya et al. ....................... 60/293
4,727,717 * 3/1988 Ikenoya et al. ....................... 60/293
5,657,628 * 8/1997 Takeuchi ................................ 60/293

FOREIGN PATENT DOCUMENTS 55-146224 * 11/1980 (JP).
57-13213 * 1/1982 (JP).
9-324624 12/1997 (JP).

* cited by examiner

Primary Examiner—Thomas Denion
Assistant Examiner—Tu M. Nguyen
(74) Attorney, Agent, or Firm—Birch, Stewart, Kolasch & Birch, LLP

(57) ABSTRACT

A secondary air supply passage joins a reed valve chamber provided on a cylinder head cover and an exhaust gas port. The secondary air supply passage includes three aligned passages formed in a cylinder head, a cam holder and a cylinder head cover. The secondary air supply passage is formed perpendicular to a cylinder head gasket. One end of the secondary air supply passage opens to a secondary exhaust gas air induction part, formed integrally with a core of the exhaust port, during casting of the cylinder head.

19 Claims, 2 Drawing Sheets

SECONDARY AIR SUPPLY PASSAGE FOR AN ENGINE

BACKGROUND OF THE INVENTION

1. Field of the Invention

The present invention relates to a secondary air supply passage structure for use in an engine exhaust purification system.

2. Description of the Background Art

Japanese Patent Laid-Open Publication No. Hei. 9-324624 shows an engine with a reed valve chamber provided on a cylinder head. A secondary air supply passage connects the reed valve chamber and an exhaust port. The secondary air supply passage is roughly parallel to a cylinder axis of the cylinder head.

It is desirable that the secondary air supply passage be formed as close as possible to a right angle with regard to the head gasket surface. By forming the secondary air supply passage at a right angle, the secondary air supply passage can be formed by a machine processing. One drawback is that when the secondary air supply passage has an end passing through the exhaust gas port, it is highly likely that the secondary air supply passage will interfere with the cam area at the top of the cam shaft. Therefore, the process of forming the secondary air supply passage becomes extremely difficult. Furthermore, if a pinch angle between the valves is narrowed, the process becomes even more difficult.

SUMMARY OF THE INVENTION

It is an object of the present invention to solve one or more of the drawbacks associated with the background art.

It is a further object of the present invention to provide a cylinder head with a secondary air supply passage oriented in an optimum direction which is easy to manufacture.

It is a further object of the present invention to provide a cylinder head with a secondary air supply passage wherein a pinch angle between an air supply valve and an exhaust valve can be made small.

It is a further object of the present invention to provide a cam holder with a secondary air supply passage which bends in direction and which is easy to manufacture.

These and other objects of the invention are fulfilled by an exhaust purification device for attachment to an internal combustion engine comprising: a cylinder head; an exhaust gas port formed in said cylinder head and establishing an exhaust gas flow path; an exhaust gas induction guide formed in said exhaust gas port, said exhaust gas induction guide being a recess formed in a side wall of the exhaust gas port extending in a direction away from the exhaust gas flow path; and a secondary air supply passage formed in said cylinder head which opens to a first outer side of said cylinder head and to said exhaust gas induction guide to provide secondary air to said exhaust port.

Further, these and other objects of the invention are fulfilled by an engine comprising: a cylinder having a combustion end and a crankcase end; a piston reciprocating along a first direction within said cylinder; a cylinder head having a first end and a second end, with said first end being attached to said combustion end; an exhaust gas port formed in said cylinder head and establishing an exhaust gas flow path; an exhaust gas induction guide formed in said exhaust gas port, said exhaust gas induction guide being a recess formed in a side wall of the exhaust gas port extending in a second direction away from the exhaust gas flow path; and a secondary air supply passage in said cylinder head which opens to said exhaust gas induction guide to supply secondary air to said exhaust port.

Moreover, these and other objects of the invention are fulfilled by a method of forming internal combustion engine parts comprising the steps of: providing a cylinder head cast having an exhaust port core with a protrusion integrally formed on the exhaust port core; casting a material using the cylinder head cast to form a cylinder head with an exhaust port corresponding to the exhaust port core and an exhaust induction guide formed on a side of the exhaust port corresponding to the protrusion; and forming a main secondary air supply passage from a first outer side of the cylinder head to the exhaust induction guide on the side of the exhaust port to provide secondary air to the exhaust port.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
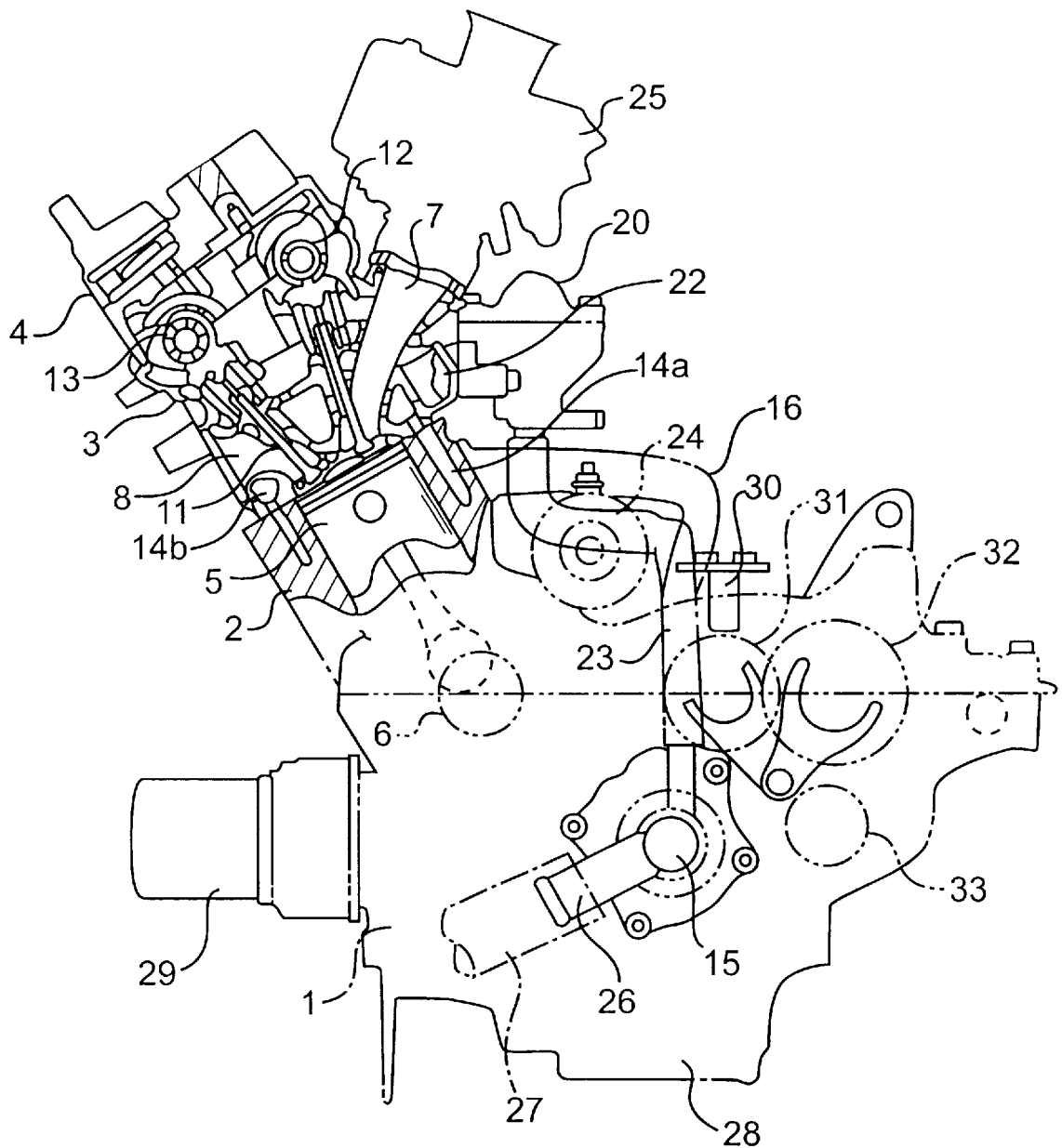
FIG. 1 is a partial cross sectional view illustrating an engine including a secondary air supply passage, in accordance with the present invention.

An explanation of an engine including the secondary air supply passage, in accordance with the present invention, will be given with reference to FIG. 1. The engine is a DOHC (double overhead cam) type, water cooled four cycle engine. The engine is provided with crankcase 1, cylinder 2, cylinder head 3, and cylinder head cover 4.

A piston 5 slides freely inside cylinder 2. The piston 5 is connected to a crankshaft 6 (in the center of the drawing) inside a crankcase 1. A combustion chamber is formed between the piston 5, the cylinder 2, and cylinder head 3.

An air supply port 7 and an exhaust gas port 8 are provided in the cylinder head 3 and connect with the combustion chamber. The air supply port 7 and the exhaust gas port 8 are opened and closed by an air supply valve 10 and an exhaust gas valve 11, respectively. The air supply valve 10 and the exhaust gas valve 11 are operated by cams on camshafts 12, 13, which revolve simultaneously with crankshaft 6.

The engine includes water jackets 14a, 14b, a water pump 15, a water hose 16, a thermostat 20, a cooling water outlet part 22, and a bypass hose 23. The engine also includes a starter motor 24, a carburetor 25, an inlet pipe 26 supplying chilled water from the radiator via a water hose 27, an oil pan 28, an oil filter 29, a speed sensor 30 for the transmission provided on a main shaft 31, a counter shaft 32 and a shift drum 33.

Figure 2:
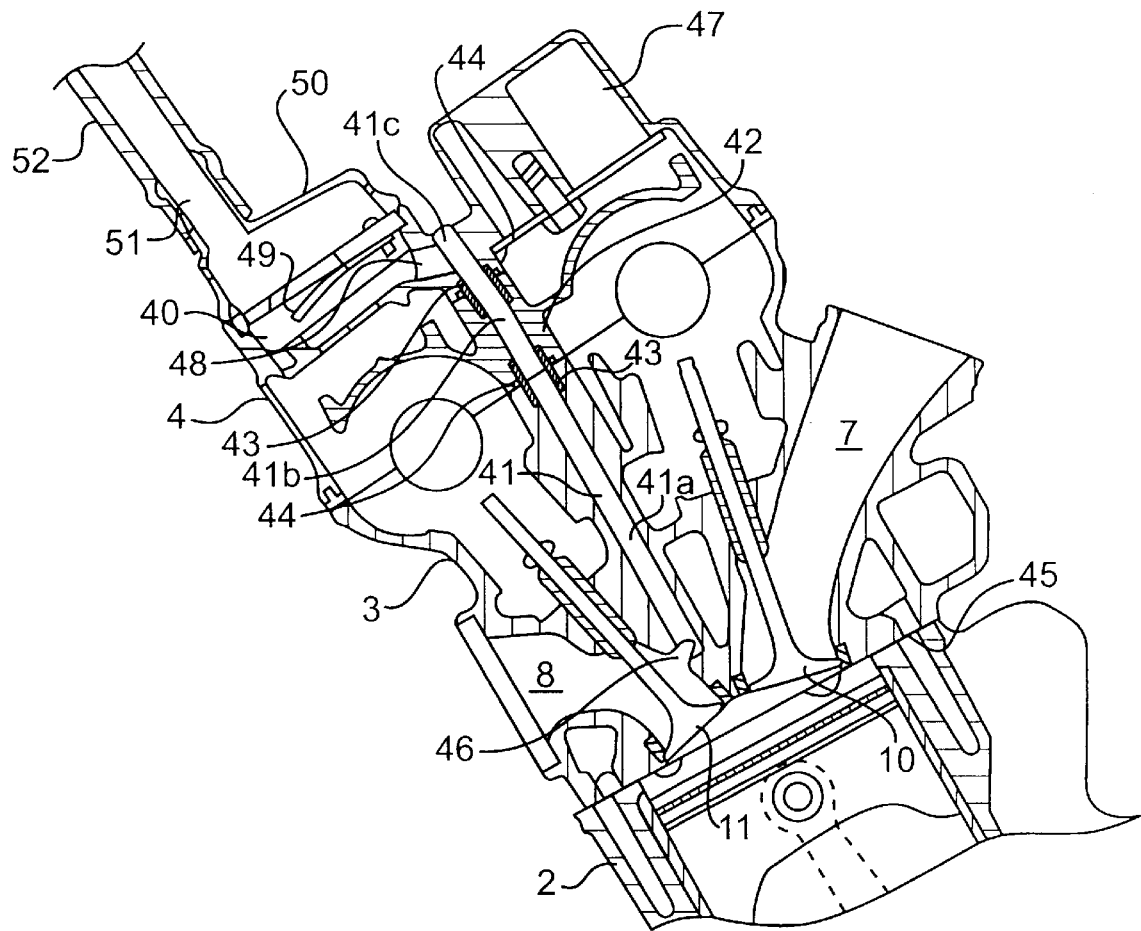
FIG. 2 is a cross sectional view of the secondary air supply passage of FIG. 1.

Next, a detailed description of the structure of the secondary air supply passage will be given with reference to FIG. 2. A secondary air supply passage 41 communicates between the exhaust gas port 8 and a reed valve chamber 40 provided on the upper surface of the cylinder head cover 4. The secondary air supply passage 41 is constructed from a main secondary air supply passage 41a in the cylinder head 3, a first continuing secondary air supply passage 41b in a cam holder 42, and a second continuing secondary air supply passage 41c in the cylinder head cover 4. Each connection between the passages 41a, 41b, and 41c is sealed by a knock pin 43, and an O ring 44.

The secondary air supply passage 41a is formed perpendicular to the gasket surface of head gasket 45, sealing between cylinder 2 and cylinder head 3. The end part of the secondary air supply passage 41a communicates with the exhaust gas port 8 via a secondary exhaust gas air induction part 46 formed as a horn shaped hole in a side of the exhaust gas port 8.

The secondary exhaust gas air induction part 46 is formed integrally with the core of exhaust port 8 during a casting of the cylinder head 3. After casting, the secondary air supply passage 41a is formed by a machine processing, and the end parts are cut off and passed through to the secondary exhaust gas air induction part 46.

The secondary air supply passage 41b is bent in the middle. The bend can be easily formed by a machine processing (e.g. drilling at different angles from the top and bottom sides of the comparatively thin cam holder 42). The secondary air supply passage 41c is formed in the thick section provided between reed valve chamber 40 and breather chamber 47. The secondary air supply passage 41c is connected to the reed valve chamber 40 by a connecting passage 48 formed in an oblique direction.

A reed valve 49 is provided inside the reed valve chamber 40, and is closed from the top by a cover 50. A joint pipe 51 is formed integrally with the cover 50. Secondary air, after being purified by a filter, is sucked in via a hose 52 through the joint pipe 51 inside the cover 50. The reed valve 49 interlocks with the exhaust gas pulsation in exhaust gas port 8. Afterwards, the secondary air is supplied to the exhaust gas port 8 via the air supply passage 41.

Next, a description of a method of forming the secondary air supply passage will be given. When casting the cylinder head 3, a material used to form the cylinder head 3 is applied to a port core having an integrated induction guide protrusion. The secondary exhaust gas air induction part 46 is formed in a position corresponding to the integrated induction guide protrusion of the cast. Then, a hole is formed from the top surface of cylinder head 3 towards this secondary exhaust gas air induction part 46. The hole becomes the secondary air supply passage 41a, communicating with exhaust gas port 8 via the secondary exhaust gas air induction part 46.

Therefore, a secondary air supply passage can be formed in an optimum location without requiring special processing. Furthermore, as the secondary air supply passage 41c is formed perpendicular to the surface of head gasket 45, making the formation simple. In addition, the pinch angle of the air supply valve 10 and the exhaust valve 11 can be made small, and this is desirable, as recently there is a tendency towards narrower pinch angles for air supply and exhaust valves.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An exhaust purification device for attachment an internal combustion engine comprising:
   a cylinder head;
   an exhaust gas port formed in said cylinder head and establishing an exhaust gas flow path;
   an exhaust gas induction guide formed in said exhaust gas port, said exhaust gas induction guide being a recess formed in a side wall of the exhaust gas port extending in an exhaust gas induction guide extension direction away from the exhaust gas flow path; and
   a secondary air supply passage formed in said cylinder head which opens to a first outer side of said cylinder head and to said exhaust gas induction guide to provide secondary air to said exhaust port, said secondary air supply passage extending in a secondary air supply direction, different than said exhaust gas induction guide extension direction, such that secondary air changes direction prior to exiting said secondary air supply passage at an interconnection of said secondary air supply passage and said exhaust gas induction guide.

2. The device according to claim 1, wherein said first outer side includes a first surface for mating to a cylinder head cover, and wherein said cylinder head further includes a second outer side including a second surface for mating to a cylinder.

3. The device according to claim 2, wherein said secondary air supply passage is a cylindrical hole.

4. The device according to claim 3, wherein said secondary air supply direction is approximately perpendicular to said second surface.

5. The device according to claim 4, wherein said secondary air supply direction is also approximately perpendicular to said first surface.

6. An engine comprising:
   a cylinder having a combustion end and a crankcase end;
   a piston reciprocating along a first direction within said cylinder;
   a cylinder head having a first end and a second end, with said first end being attached to said combustion end;
   an exhaust gas port formed in said cylinder head and establishing an exhaust gas flow path;
   an exhaust gas induction guide formed in said exhaust gas port, said exhaust gas induction guide being a recess formed in a side wall of the exhaust gas port extending in a second direction away from the exhaust gas flow path; and
   a secondary air supply passage in said cylinder head which opens to said exhaust gas induction guide to supply secondary air to said exhaust port, wherein said secondary air supply passage is a cylindrical hole extending generally in a third direction which is different from said second direction, such that secondary air changes direction prior to exiting said secondary air supply passage at an interconnection of said secondary air supply passage and said exhaust gas induction guide.

7. The engine according to claim 6, wherein said third direction of said secondary air supply passage is approximately parallel to said first direction of reciprocation of said cylinder.

8. The engine according to claim 6, wherein said engine is a four-cycle engine.

9. The engine according to claim 6, wherein said secondary air supply passage is a main secondary air supply passage, and further comprising:
   a cam holder having one end attached to said second end of said cylinder head, and having an opposite end;
   a cylinder head cover attached to said second end of said cylinder head and to said opposite end of said cam holder; and
   a first continuing secondary air supply passage formed in said cam holder.

10. The engine according to claim 9, further comprising:
    a second continuing secondary air supply passage being formed in said cylinder head cover.

11. The engine according to claim 10, wherein said first continuing secondary air supply passage is bent to a fourth direction different than said third direction.

12. The engine according to claim 11, further comprising:
    reed valve chamber formed in said cylinder head cover, and wherein said second continuing secondary air supply passage extends in said fourth direction and opens to said reed valve chamber.

13. The engine according to claim 10, further comprising:
    a first joint between said main secondary air supply passage and said first continuing secondary air supply passage; and
    a first o-ring sealing said first joint.

14. The engine according to claim 13, further comprising:
    a second joint between said first continuing secondary air supply passage and said second continuing secondary air supply passage; and
    a second o-ring sealing said second joint.

15. A method of forming internal combustion engine parts comprising the steps of:
    providing a cylinder head cast having an exhaust port core with a protrusion integrally formed on the exhaust port core, wherein the exhaust port core extends in an exhaust gas flow direction and the protrusion extends in an exhaust gas induction guide extension direction away from the exhaust gas flow direction;
    casting a material using the cylinder head cast to form a cylinder head with an exhaust port corresponding to the exhaust port core and an exhaust gas induction guide formed on a side of the exhaust port corresponding to the protrusion; and
    forming a main secondary air supply passage from a first outer side of the cylinder head to the exhaust gas induction guide on the side of the exhaust port to provide secondary air to the exhaust port, wherein the main secondary air supply passage extends in a secondary air supply direction, different than the exhaust gas induction guide extension direction, such that secondary air changes direction prior to exiting the main secondary air supply passage at an interconnection of the main secondary air supply passage and the exhaust gas induction guide.

16. The method according to claim 15, further comprising the steps of:
    providing a cam holder;
    forming a first continuing secondary air supply passage in the cam holder; and
    attaching the cam holder to the cylinder head such that the first continuing secondary air supply passage is aligned with the main secondary air supply passage.

17. The method according to claim 16, wherein said step of forming the first continuing secondary air supply passage includes forming a hole from one end of the cam holder partially into the cam holder and forming a second hole from an opposite end of the cam holder partially into the cam holder to meet the first hole.

18. The method according to claim 17, wherein the first hole extends at an angle relative to the second hole.

19. The method according to claim 16, further comprising the steps of:
    providing a cylinder head cover and a reed valve chamber within the cylinder head cover;
    forming a second continuing secondary air supply passage in the cylinder head cover; and
    attaching the cylinder head cover to at least one of the cam holder and the cylinder head such that the second continuing secondary air supply passage is aligned with the first continuing secondary air supply passage.

* * * * *